United States Patent [19]
Elder et al.

[11] 3,736,420
[45] May 29, 1973

[54] SWITCH CONTROL ARRANGEMENT FOR RAILROAD CLASSIFICATION YARDS

[75] Inventors: J. Calvin Elder; William B. Dufer, both of Penn Hills Township, Allegheny County, Pa.

[73] Assignee: Westinghouse Air Brake Company, Swissvale, Pa.

[22] Filed: Sept. 13, 1971

[21] Appl. No.: 179,728

[52] U.S. Cl. .......................... 246/182 AA, 104/26 R
[51] Int. Cl. ............................................. B61l 19/14
[58] Field of Search ............ 246/77, 182 A, 182 AA, 246/182 AB; 104/26

[56] References Cited

UNITED STATES PATENTS 2,915,622  12/1959  Coley............................246/182 AA Primary Examiner—Gerald M. Forlenza
Assistant Examiner—George H. Libman
Attorney—H. A. Williamson, A. G. Williamson, Jr. and J. B. Sotak

[57] ABSTRACT

The central data processor controlling the automatic switching system also compares the initial axle count, registered when a car enters the yard, with the axle count for that car from a wheel detector in the approach to each switch along the selected route. As long as the compared counts are not equal, the data processor holds energized an added detector relay. Back contacts of this relay interrupt the switch control circuit network to inhibit switch operation to the position selected for the next car, in the same manner as switch detector track circuit relay contacts are used. Thus the switch is locked against movement, not only when the associated track circuit is occupied but by lack of comparison between the axle counts if the track circuit is spanned, and full operating safety is maintained even with long cars. Blocking jacks for each storage track are provided in the track diagram on the yard control console. Insertion of a plug into a jack, to block further entry of cars in that track, activates a circuit network which bypasses and thus inhibits control of the key switch for that track by the data processor. Rather the key switch is positioned and held, overriding all other controls, to route all approaching cars away from the route to the blocked track or tracks.

12 Claims, 3 Drawing Figures

SWITCH CONTROL ARRANGEMENT FOR RAILROAD CLASSIFICATION YARDS

Our invention relates to a switch control arrangement for railroad classification yards. In particular, the invention pertains to a control arrangement for such track switches which automatically modifies control of the switch under conditions when long cars span the track detection or when one of the storage tracks to which the switch leads has been selectively blocked or closed off.

One factor in the design of railroad classification yards is the humping speed, that is, the speed at which the cars or cuts of cars are pushed over the crest. This humping speed must be kept as high as reasonably possible to maintain a high level yard throughput. One related feature, in order to achieve rapid movement of the cars over the hump, is that switch locking time must be kept at a minimum. This is the time during which the switch points of those switches leading to the various storage tracks are locked in position due to the passage of a car over that switching area. Conventionally, switch locking is controlled by an associated switch detector track circuit so that the switch points are locked in position while the cut of cars, specifically one or more of its wheel-axle units, occupies the switch detector track section. The minimum approach distance to the switch points over which such a track circuit is effective is proportional to the maximum speed of the cuts of cars at that location and the maximum operating time required to move the switch points from an existing position to the opposite position. Said in another way, the minimum approach distance for track circuit locking must be that which will allow the switch, if it is moving when a cut enters the corresponding track circuit, to complete its movement prior to the actual arrival of the leading wheels at the switch points. HOwever, when such detector track sections are made extremely short in order to achieve this minimum locking time, they then become subject to being spanned by long cars presently in use in railroad operations. Such spanning, that is, the straddling of the track section by the wheel units at each end of a car, of course releases the switch track circuit locking so that it may be possible for the switch points to begin to move to occupy the next selected position prior to the time that the complete cut has cleared. That is an unsafe situation which will cause an accident. In the past, one method of eliminating this inadvertent unlocking has been to use a photocell arrangement to jointly maintain the detection of the cut of cars while it passes through the switching location. However, such added equipment is subject to additional failures and may also provide false indications due to inadvertent interruption of the light beam of whatever type used. With the use of digital data processing apparatus to control the operation of such classification yards and to track the various cars to storage areas for inventory reports, additional capabilities of protecting against improper switch movements under long cars have become available. Another factor in the design of the yards is an arrangement to permit the yardmaster or train coordinator to block from use or close off a particular storage track in a simple manner. Such selective blocking of a storage track may be necessary if an unusual condition occurs during the humping operation not accounted for in the planned or programmed operation.

Accordingly, an object of our invention is an improved control arrangement for switches in railroad classification yards.

Another object of the invention is a control arrangement for track switches in a classification yard which incorporates an improved means for detection of cuts which span the conventional switch detector track section.

A further object of the invention is a switch control arrangement for classification yards which inhibits the positioning of the switch to a new position under a long car which momentarily spans a detector track circuit while traversing the switch.

A still further object of the invention is a modified control arrangement for classification yard switches which includes a means to inhibit the operation of the switch to establish a route to a storage track which has been selectively blocked or closed off.

It is also an object of the invention to provide a control arrangement for the switches in a classification yard which includes a convenient means by which the yard coordinator may selectively inhibit the operation of a switch to a selected position in order to close off a storage track to further car entry.

Still another object of our invention is a computer controlled arrangement for positioning the switches in classification yards, to route cars to a selected storage track, which includes means to inhibit the positioning of the switch if a long car spans the conventional detector track section and to inhibit the positioning of the switch to route cars to a storage track which has been selectively blocked or closed for operational purposes.

Other objects, features, and advantages of our invention will become apparent from the following specification when taken in connection with the appended claims and the accompanying drawings.

The basic automatic control system for classification yards to which our invention is added is, of course, well known. In general, such control systems use central data processing units of the digital type for car routing and speed control. However, the speed control is not involved in the present invention and will not be described in detail. In the operation of the yard control systems, the preselected storage destinations for each car or cut of cars are entered into the central data processing unit which then controls the yard switches to align the proper routes as the various cuts move throughout the yard, arriving at the various switches in succession. The speed control portion, in addition to controlling coupling speeds, complements the switching arrangement to maintain cut separation to allow changes in switch position between successive cuts of cars at the same switch. The data processing unit also tracks the cars during their movement to the storage tracks in order to maintain an inventory of cars located in each such storage or bowl track. In order to accomplish this tracking process, the data processing unit uses car parameter data which is received and recorded from an initial car detector. The data processing unit also detects the passage of cars at each switch by the occupancy of the corresponding track circuits and by wheel detectors located in the approach to each switch. Each detector track circuit is, as previously explained, made as short as possible to allow maximum operating time for the switch between successive cuts. It is this short detector track section length which the long cars presently in frequent use may span so that the track circuit indicates nonoccupancy and thus unlocks the switch for the next movement. Our invention makes use of the comparison within the central data processing unit of the known cut or car axle count from the initial detector and the input from the wheel detector in the approach at each switch. We add then to the general system an output relay controlled by this data processing unit to indicate when the wheel detector count at the switch is not equal to the recorded initial count. This count-not-zero relay controls the switch operating circuit to inhibit switch operation to the position for the next cut until the wheel counts match, the use of the detector track circuit also being incorporated in a conventional manner.

We also provide on the control console at the location of the yardmaster or yard coordinator various plug jacks positioned in the track diagram, at least one for each storage track. When the yard coordinator wishes, for any reason or for an operating need, to block further entry of cars into a particular storage track, he inserts a plug into the corresponding blocking jack for that track. Insertion of this plug completes a predetermined circuit path in the control circuit network for the final switch, also designated the key switch leading to the blocked track. This circuit path is used to inhibit the positioning of that final or key switch to align the route for cars to move into the blocked track. In other words, the last or key switch is held in the position to route all cars away from the blocked or closed off track. If two or more adjacent tracks or a whole group have been blocked to further car entry, switch circuit networks are designed to hold the final or key switch for these several tracks or the whole group of tracks in a position to inhibit the move of any further cars into such bowl storage tracks. The two inhibiting arrangements are incorporated into the conventional control circuit for each switch so that the inhibiting process is automatically achieved when cars span the track circuit or one of the diverging tracks is blocked.

We shall now describe in detail a specific arrangement embodying the features of our invention and shall then point out the novel features thereof in the appended claims. From time to time during this description, reference will be made to the accompanying drawings in which:

FIG. 3 is a diagrammatic illustration of the control and indication circuits related to a particular switch shown in FIG. 2, the circuit network embodying the control features of our invention.

In each of the drawings, similar references designate the same or similar parts of the apparatus. In the showing of FIG. 3, a source of direct current energy for the operation of the relays and similar apparatus is assumed. However, a specific source is not shown since the use of such is conventional and any one of several types of sources may be used. Connections to the positive and negative terminals of this direct current source are designated by conventional plus (+) and minus (−) symbols, respectively. All contacts controlled by a particular relay are shown in vertical line above or below the conventional winding symbol. All the armatures or movable elements of such contacts controlled by a particular relay move up to close against front contacts when the relay winding is energized.

Figure 1:
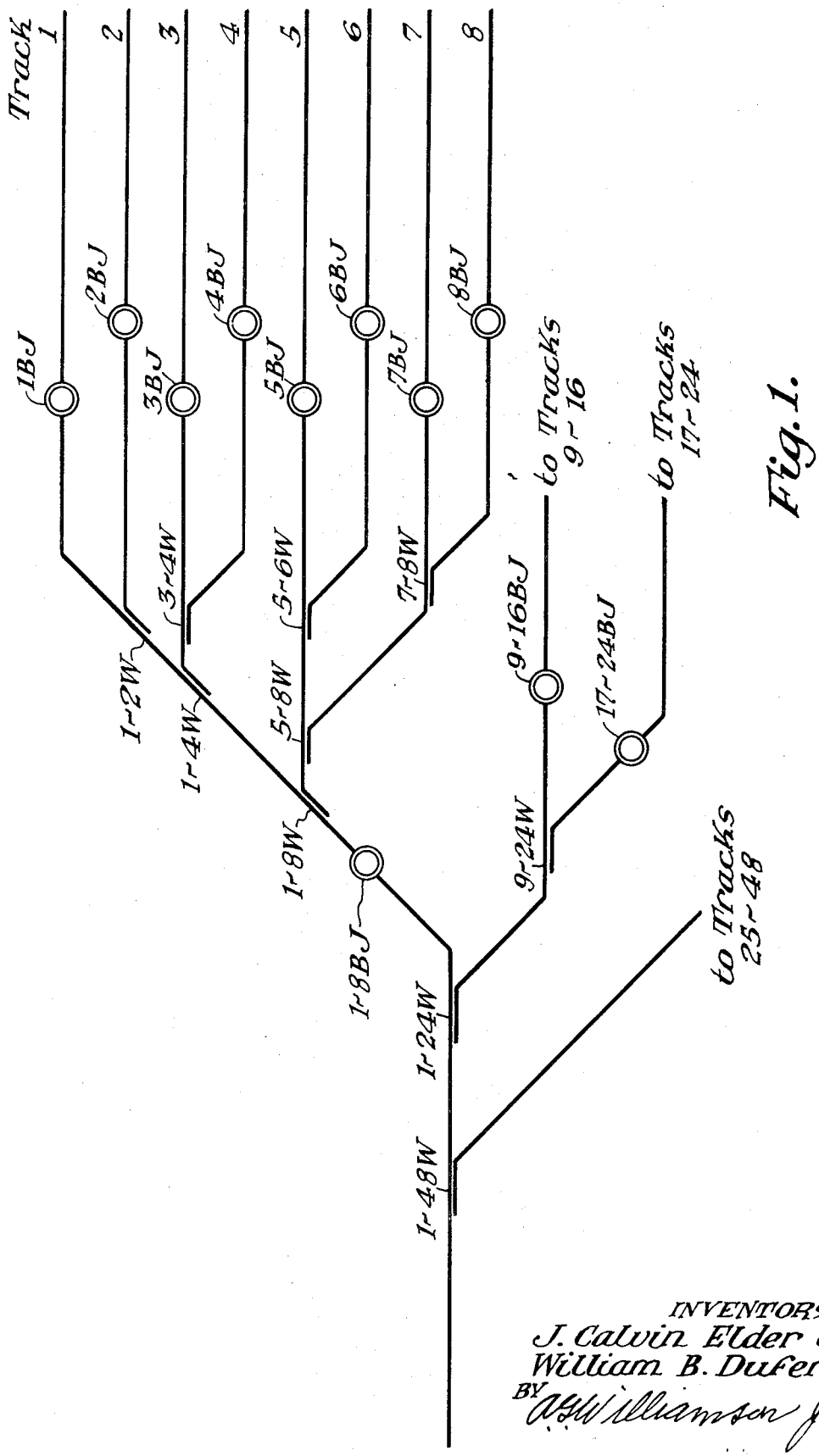
FIG. 1 is a schematic illustration of a portion of a classification yard control or display console used by the yard coordinator, which yard console embodies the blocking jacks of our invention.

Referring now to FIG. 1, a portion of the track diagram on the display panel of the yard control console is illustrated. Only one group of the storage or bowl tracks, 1 through 8, is shown in detail. The switch network or matrix leading from the yard hump or crest at the left of the drawing to group tracks 1 through 8 is illustrated with necessary turnouts over other switches to designate the presence of other storage tracks not specifically shown. Each switch is designated by the reference W with a dual number prefix designating the lowest and highest numbered tracks to which routes over that switch lead. For example, at the upper part of the drawing is a track switch 1-2W which controls the routes leading to the tracks 1 and 2. The lead switch to the specific group of tracks shown is designated as switch 1-8W since routes over this switch lead to all of the tracks of the group, the lowest number being track 1 and the highest, track 8. As will appear in the other figures of the drawings, apparatus associated with each track switch, such as switch movements and track circuits, also use the same dual number prefix associated with the specific reference character.

A blocking jack BJ, each illustrated by a double concentric circle symbol, is shown mounted in the panel or console along the single line designating each storage track. As will appear later in greater detail, each jack is similar to a jack in a telephone switchboard but with the specific contact structure illustrated in the upper right of FIG. 3. The plugs used for insertion into these jacks may be made of insulated material since no circuit connections are made between the jack and the plug itself. Each storage track of the 48 indicated in the illustrated yard has a blocking jack, designated by the reference BJ with a single track number prefix, such as blocking jacks 1BJ and 2BJ for tracks 1 and 2, respectively. Also, each eight-track group lead has a similar jack with a dual number reference prefix. Three are illustrated, the group blocking jacks 1-8BJ, 9-16BJ, and 17-24BJ. As will be described in detail later, the yard coordinator manually inserts a plug into a selected jack when he selectively desires to block further use of a particular track, that is, when he selectively desires to block the entry of further cuts of cars into the track for storage. Obviously, a similar plug inserted in a group lead blocking jack will close off or block the entrance of cars into all of the tracks of that group.

Figure 2:
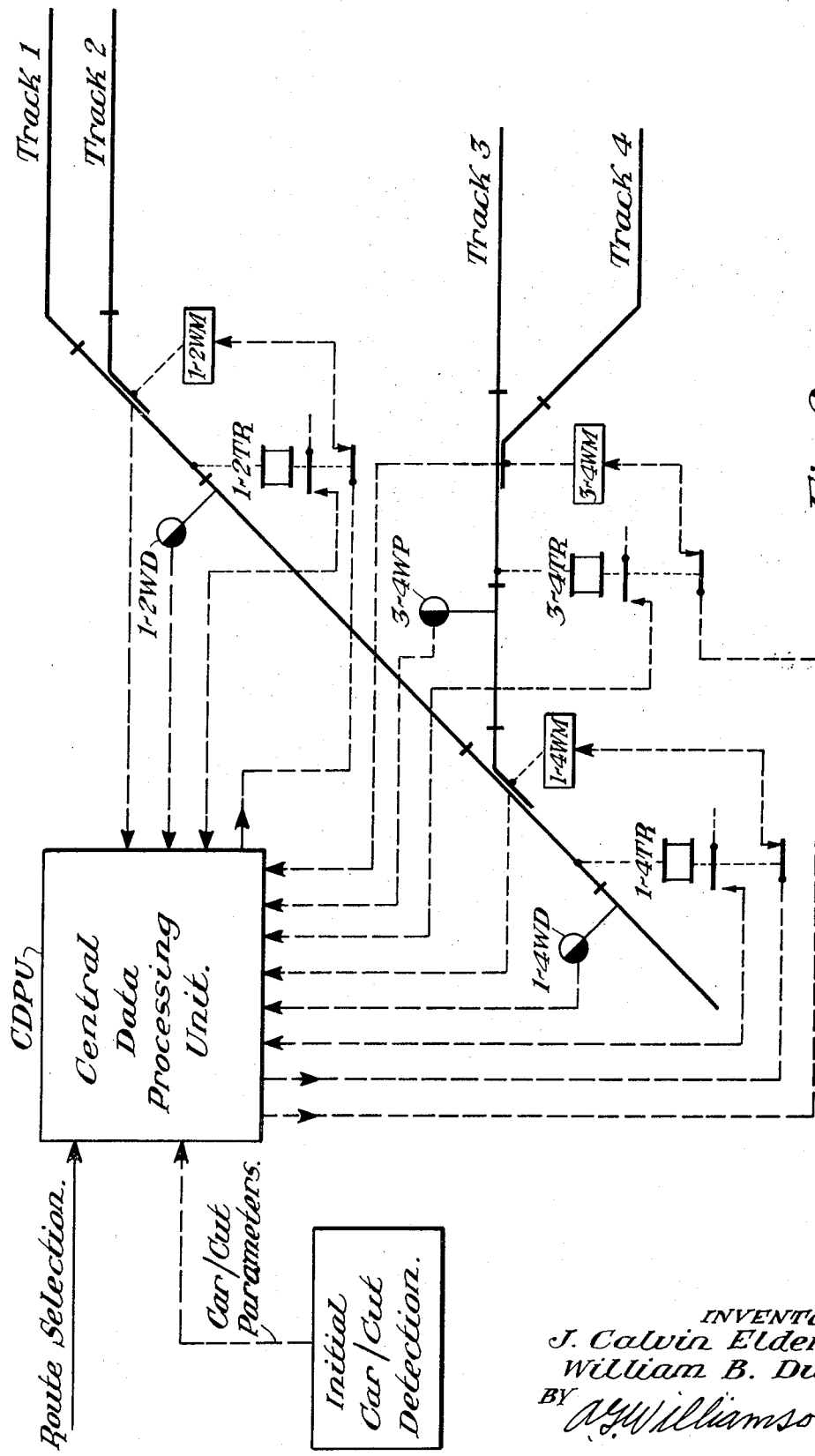
FIG. 2 is a schematic showing of a portion of the yard storage track group illustrated in FIG. 1, further showing the switch movement controls and train detection arrangement embodying our invention.
Figure 5:
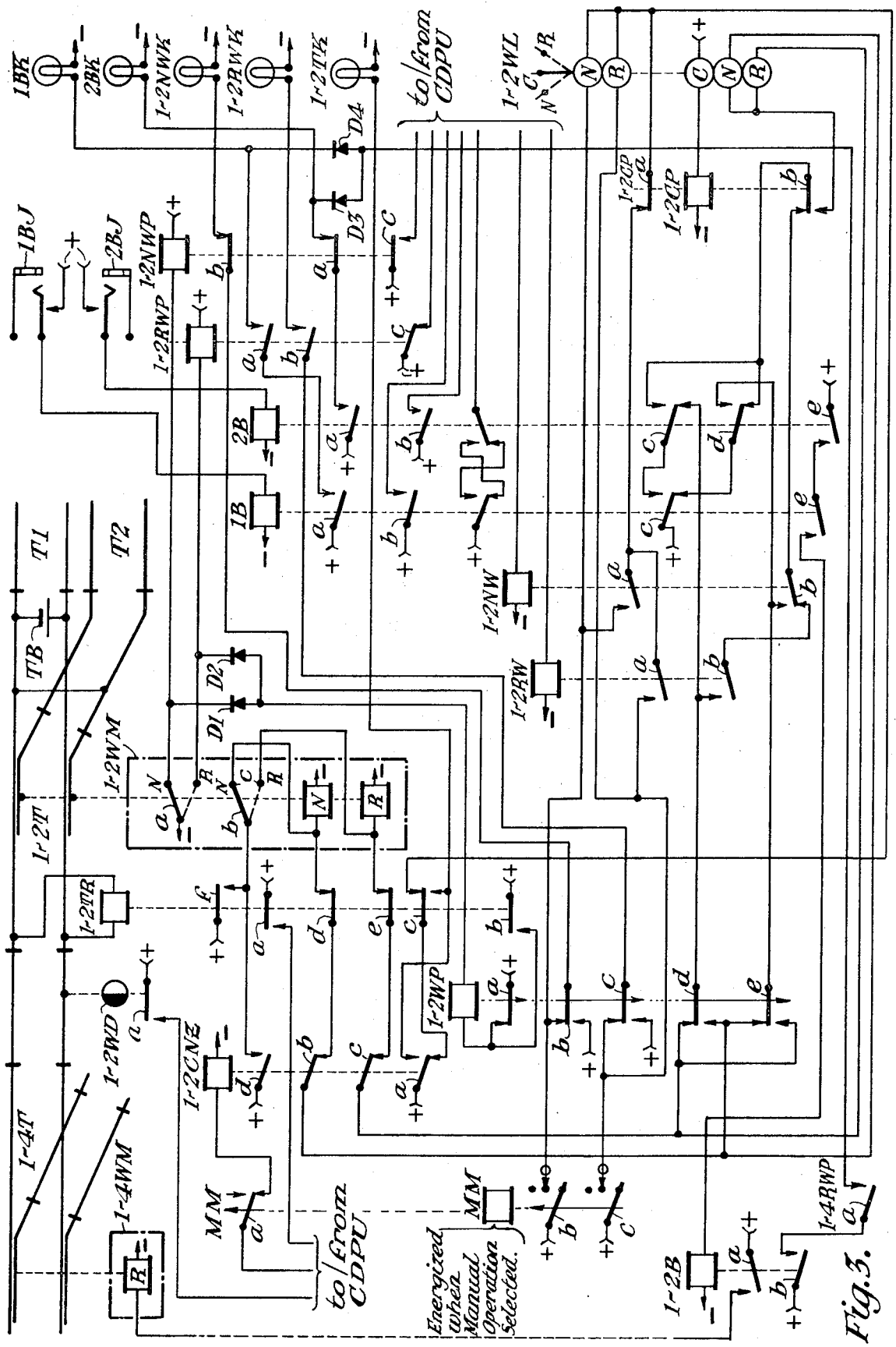

A portion of the field track layout in conventional single line symbol form is shown in FIG. 2. This is part of the group of storage tracks 1 to 8 illustrated on the console display of FIG. 1, the tracks 1 to 4 being illustrated with the associated switches 1-2W, 1-4W and 3-4W. However, reference characters for the switches themselves are not used but rather each power switch movement is referenced using the symbol or reference WM with a two-number prefix corresponding to the switch designation. These switch movements are shown by a conventional block connected to the symbol representing the track layout at the switch by a conventional dotted line which represents the operational control by the switch movement of the switch points. These switch movements are assumed for purposes of the present description to be of the electropneumatic type although other types of power switch movements may be used.

Associated with each track switch is a detector track circuit illustrated by the insulated joint symbols defining the limits of the corresponding track section and the track circuit relay. Each track relay is designated by the reference TR with a numerical prefix which is the same as that used for the switch designation. More specific description concerning the track circuit arrangement will be provided in connection with FIG. 3. Briefly, when any wheel-axle unit of a cut of cars is within the track circuit limits defined by the insulated joints, the track relay releases. Also associated with each switch and mounted along the track adjacent to the corresponding track circuit is a wheel detector illustrated by the conventional symbol for such apparatus. Each wheel detector is designated by the reference WD with a number prefix the same as that for the associated switch. Thus the wheel detector in the approach to switch 1-2W is designated by the reference character 1-2WD. Each of these wheel detectors is of the type that detects the passage of each car wheel along the one rail near which the wheel detector is mounted. The wheel detector thus detects the passage of each car axle and provides a count of such axles as they pass by that location. Such wheel detectors may also detect the direction of movement of the cut of cars but in the present description direction is not a critical feature and it is not necessary to consider wheel detectors as having this particular capability.

Also shown by a conventional block is the central data processing unit for the yard control system, designated by the reference character CDPU. Preferably and usually this is a process control digital computer apparatus of any suitable type. This unit receives information and command selections from various field and control locations, respectively, and generates and transmits control functions to the yard apparatus. In the specific description herein, the CDPU controls the positioning of the track switches in the class yard in accordance with preselected routes for each cut of cars. Such data processing apparatus will normally also control the speed of the cuts but, as previously designated, such control is not involved in the present invention and is not described. The data processor CDPU also performs various other functions, for example, the tracking of cars into the storage or bowl tracks in order to record and provide on request an inventory of the cars stored in the yard. Specifically in this invention, this data processing unit also provides protection at the switch locations in the event that long cars span the detector track circuits. For switch control and related functions, the CDPU receives route selections, as indicated at the left by the input flow line, for the train being humped. The route selection may be a manual operation, cut-by-cut on a track selection panel as the train is pushed up the reverse side of the hump. However, the input may also be automatic in any known manner from previously prepared input data cards, tapes, or from a remote location which has recorded the consist of the train. The correlation between the prepared route selection and the actual train as it is pushed up and over the crest may be provided, for example, by automatic car identification equipment. Such details are not involved herein as it is immaterial to the present description as to how the route selections are provided, it being merely necessary to realize that the CDPU is providing switch controls to position each switch in the yard prior to the arrival of the next cut in accordance with a preselected destination for the approaching cut.

Also input into the CDPU are various parameters of the cars in the train being pushed over the crest. The car cut parameters are input into the data processor from an initial car detection means which may be that disclosed in the U.S. Pat. No. 3,504,173, issued Mar. 31, 1970, to Emil F. Brinker, for An Arrangement for the Measurement of Physical Parameters of Freight Cars in Classification Yard Operations. Among other parameters, this initial detection apparatus provides a wheel or axle count for each car or cut of cars released into the yard over the hump. This axle count is identified with a particular cut when it is stored in the CDPU and may be recalled for use for comparison purposes, as will be more fully explained later, when the wheel count from the various yard wheel detectors is input into the data processor.

The CDPU receives inputs also from the field apparatus associated with the actual yard track layout. For example, such inputs include the position of each track switch, the detector track section occupancy indications from the track relays TR, and wheel-axle counts from each wheel detector WD. These inputs are illustrated by the dotted lines from the corresponding field apparatus to the CDPU, such flow lines having input arrows at the unit end. The CDPU also outputs control functions to select and actuate switch positioning for routing the various cuts of cars moving throughout the yard to their selected storage tracks. These outputs are also illustrated by conventional dotted lines having output arrows leading to the various switch movements WM. Control of the switch position output functions by the corresponding track relay TR is also indicated by the conventionally shown front contacts of the track relays. The full switch movement control circuit operation will be provided in connection with the description of the circuit arrangement shown in FIG. 3, to which we now turn in order to complete the description of the disclosed arrangement.

Across the top at the left and center of FIG. 3 is a two-line conventional representation of part of the track layout from FIG. 2. Specifically, the illustration begins at the left with switch 1-4W and shows the track lead from that switch to switch 1-2W and to the initial portion of the tracks diverging from the latter switch, track 1 as referenced by the symbol T1 and track 2 indicated by the reference T2. In this description, it is defined that a track switch positioned to route cars to the track diverging to the left is in its normal position, while if a car is diverted to the right the switch is in its reverse position. Thus a car or cut moving over switch 1-4W in its normal position proceeds along the track lead shown here to switch 1-2W and thence either to track T1 or track T2, as the latter switch is in its normal or reverse position, respectively.

The detector track section 1-2T and the corresponding detector track circuit associated with switch 1-2W is shown. The limits of this track circuit are defined by the insulated joints shown by standard symbols. For convenience, this track circuit is illustrated as a d.c., neutral track circuit having a track battery TB connected across the rails at one end and the track relay 1-2TR connected across the rails at the other end. A simple cross bond connection includes the turnout to track T2 within the operational limits of the track circuit. When one or more wheel and axle units of a car occupy the track section within the limits defined by the insulated joints, the track circuit is shunted and relay 1-2TR will release. Otherwise, the track relay is energized and picked up. Actually any type of track circuit may be used for this purpose as, for example, an overlay or high frequency, high shunt type track circuit without any insulated joints. For purposes of the following description, however, the directed current type circuit is used to provide the necessary illustrations. A portion of track section 1-4T associated with switch 1-4W is shown but the track circuit is not specifically illustrated as it does not enter into the following description.

Mounted adjacent the lower rail of the track symbol along the approach to track section 1-2T is the wheel detector 1-2WD. This wheel detector, shown by a standard, conventional symbol, is so positioned adjacent the rail, as indicated by the dotted line, that the passage of each wheel along the corresponding rail actuates the wheel detector to close its single normally open contact *a*. These wheel detectors will normally be located within the limits of the associated switch detector track section, for purposes not herein involved, and such positioning is included in our disclosure. However, for illustration convenience, unit 1-2WD is here shown just outside the section, that is, just ahead of the insulated joint. When so located, detector 1-2WD is located at least close enough to the insulated joint of section 1-2T that, when the wheel detector responds to the last wheel of a cut, the preceding wheel-axle unit on the car truck is within the track section limits to shunt the track circuit. Each time contact *a* of detector 1-2WD is closed to count the passage of a wheel and axle unit, a pulse of energy from the positive terminal of the local d.c. source is transmitted to the data processing unit CDPU, over the obvious circuit, to register the count. This corresponds to the dotted, flow input line in the flow chart of FIG. 2. It may be noted also that a similar input to unit CDPU is provided, when track section 1-2T is occupied, over back contact *a* of relay 1-2TR. This also, of course, corresponds to the input shown in FIG. 2.

Switch movement 1-2WM, shown by a conventional dot-dash block in FIG. 3, controls the position of switch 1-2W and detects the location of the switch points to control the indication circuitry. Since, for purposes of this description, the switch movement are assumed to be of the electropneumatic type known in the art, two valve magnets are illustrated within the switch movement, each by a conventionally used block symbol. One magnet is designated the normal or N magnet by the inserted reference character while the other magnet is the reverse or R magnet. When a magnet winding is energized, the switch movement responds to operate the switch points to the corresponding position, that is, normal or reverse. A first circuit controller contactor *a* follows the positioning of the switch points and thus has two positions, normal N and reverse R, which it occupies when the points of switch 1-2W are respectively positioned normal or reverse. In each position, the circuit controller contactor completes a circuit between the negative terminal of the source and the corresponding N or R terminal. A second circuit controller contactor *b* of the switch movement also has two principal positions N and R which it occupies to follow the positioning of the actual switch points. Contactor *b* also has a third position in the center designated by the reference C which it occupies when the switch points are midway in their stroke between the terminal positions. Contactor *b* completes a circuit from the negative terminal of the source when in its N and R positions and also when enroute from each position toward the center position C as shown by the short arcs extending inwardly from the N and R contactor positions.

A portion of switch movement 1-4WM, associated with switch 1-4W, is shown in the upper left of this figure associated with that switch. Switch movement 1-4WM is similar to movement 1-2WM but only the reverse valve magnet R is shown within the small dot-dash block. This is sufficient for the later explanation of the operation of this system, the remainder of switch movement 1-4WM operating in a manner similar to that which will be described for switch movement 1-2WM.

To the right of the illustration of tracks T1 and T2, using conventional symbols, are shown the blocking jacks BJ associated with each of these two tracks. In the conventional showing, the insertion of a plug of insulated material within the opening in the blocking jack causes the movable contact to close against a fixed contact point which is connected to the positive terminal of the source. The completion of this circuit connection completes the obvious circuit for energizing the corresponding blocking relay 1B or 2B. These blocking relays thus repeat the operation of the blocking jack and plug arrangement and are used in order to provide sufficient contacts for controlling the several circuit paths as necessary. In other words, for example, relay 1B is energized and picks up to close front contacts at any time that a blocking plug is inserted in blocking jack 1BJ. Otherwise, relay 1B is deenergized and in its released position. Relay 2B operates in a similar manner.

Also associated with the detection of car cuts crossing switch 1-2W is the count-not-zero relay 1-2CNZ. This relay provides protection against the inadvertent movement of the switch points under a long car which spans the detector track circuit. As previously described, wheel detector 1-2WD provides a count of the passing car wheels direct to the data processor CDPU, which has stored therein the initial detection wheel count as indicated by the input arrangement of FIG. 2. Unit CDPU compares the count being entered by wheel detector 1-2WD with that already recorded and maintains relay 1-2CNZ energized as long as the two counts are not equal, i.e., the comparison count is not zero. The energizing circuit from unit CDPU includes back contact *a* of the manual mode relay MM so that the energizing circuit for relay 1-2CNZ is interrupted when this back contact is opened.

As indicated by the note in the drawing, relay MM is energized when the manual operation mode is selected to replace the normal automatic operation of the classification yard. For convenience, relay MM is defined and illustrated as a three-position, slow pickup relay. In other words, when relay MM is energized, its contact *a* does not pick up to close against a front contact point and open the corresponding back contact until a preselected time interval has expired. This slow pickup characteristic is conventionally designated by the upward pointing arrow drawn through the movable portion of each contact. For convenience, since the complete operation of relay MM and its various repeater arrangements is not involved in the present invention, other contacts b and c of this relay are shown as having three positions. Contact b, for example, closes against the center position contact immediately when the relay winding is energized, this contact being designated as a checking contact by the small circle superimposed upon the contact symbol. When the preselected time interval has expired, contacts b and c are further picked up to assume an upper position in which the circuit over each center position contact is interrupted. Thus contacts b and c of relay MM complete a circuit from the positive terminal of the local source to the corresponding center contact only during the preselected pickup time interval. As indicated, this conventional showing of the contacts of relay MM and the defined slow pickup characteristic is for convenience only, for purposes of the following description, but adequately describes the operation and the circuit closings when the manual mode of operation is initially selected.

Associated with switch movement 1-2WM are the switch control relays 1-2NW and 1-2RW, the switch position repeater relays 1-2NWP and 1-2RWP, and a switch repeater relay 1-2WP.

The switch control relays are directly energized, one or the other, from the data processor CDPU in accordance with the switch position necessary to establish the preselected route or destination for the next approaching cut of cars. The operation of these relays and the control of the switch positioning will be discussed later. The switch position repeater relays are controlled by circuit controller contact a of the switch movement. When this circuit controller contact is in its normal N position, as indicated, an obvious circuit is completed between the positive and negative terminals of the local source which includes the winding of relay 1-2NWP which, thus energized, picks up to close its front contacts. When the switch is positioned reverse, contact a completes a circuit in its reverse R position to energize relay 1-2RWP. Obviously one or the other of these switch position repeater relays is energized as the switch occupies its full normal or reverse position. It is to be noted that indications are provided to unit CDPU over back contacts c of the switch position repeater relays to indicate and record in the data processor the existing position of switch 1-2W.

Switch repeater relay 1-2WP is normally energized when the corresponding switch is in either position by a stick circuit which includes front contact a and the winding of relay 1-2WP and one or the other of the multiple paths over diode D1 and circuit contactor a in its N position, or diode D2 and circuit contactor a in its R position. Relay 1-2WP is provided with slow release characteristics, conventionally designated by the downward arrows through the movable part of each contact set, so that it holds its front contacts closed for a predetermined time interval after the relay winding is deenergized. Thus front contact a remains closed during the usual movement of switch 1-2W between its normal and reverse positions. That is, while circuit controller contact a is moving between its N and R positions, front contact a remains closed so that the relay winding is reenergized when the switch completes it movement. If switch 1-2W fails to operate and close in the full opposite position, so that circuit controller contact a fails to reclose the stick circuit, relay 1-2WP will eventually release. A pickup circuit for this relay includes back contact b of relay 1-2TR, which bypasses the open front contact a of the relay in the stick circuit when the track circuit is shunted by a passing car. If relay 1-2WP does release, it serves to drive or operate switch 1-2W to return to its initial position, that is, the position it occupied when the incomplete movement was started. This operation will be described shortly. Under these conditions, the pickup circuit then becomes active when the car enters the track circuit. Conventionally, the release of relay 1-2WP will energize or actuate some form of an alarm to warn the yard coordinator that a switch has failed to complete a desired movement but this alarm is not here shown as such are conventionally known in the art.

Further associated with the control of switch 1-2W is a manual switch control lever 1-2WL shown in the lower right of FIG. 3. This is a three-position, manually operable lever having a normal N, a center C, and a reverse R position. During the usual automatic operation mode of the yard, this lever remains in its center C position. Below the symbol for the lever operating arm are symbols designating the various contacts closed when the lever is in the designated positions. Each of these contacts is shown in the conventional manner by a circle with an inserted reference designating the normal, reverse, or center position of the lever in which that particular contact is closed. With the lever in its center position, a lever repeater relay 1-2CP is energized by a circuit between the positive and negative terminals of the source including a center position contact of the lever and the winding of the relay. Obviously, any time this switch lever is used to control the switch, that is, is moved to its N or R position, the circuit for relay 1-2CP is interrupted and this relay releases to indicate the manual operation of the switch lever. The N and R contacts of this lever are used in alternate control and indication circuits for the switch and will be described shortly. A similar lever WL is provided for each switch in the classification yard and is normally mounted on a control panel used when the manual mode of yard operation has been selected. Such levers may be provided in multiple at more than one manual control point.

Also on the manual control panel are various indication lights, five representative examples of which are shown in the upper right of FIG. 3. These are the track block lights 1BK and 2BK for tracks 1 and 2, respectively; the switch indication lights 1-2NWK and 1-2RWK for indicating switch 1-2W normal and reverse, respectively; and the track occupancy indication lamp 1-2TK which repeats the occupancy condition of switch detector track section 1-2T. These lights also may be repeated in multiple at several locations where such indications are necessary for the various modes of yard operation. Track indication lamp 1-2TK is energized at times over back contact a of relay 1-2CNZ and back contact c of relay 1-2TR, these contacts when closed completing the circuit through the lamp filament between the positive and negative terminals of the source. The closing of front contact a of relay 1-2CNZ also completes an alternate circuit for energizing this track indication lamp.

The lighting of either one of the track block indication lamps not only designates that a plug has been inserted into the corresponding blocking jack but that the necessary switch position or route has been established which will prevent any cars from entering that particular track. For example, a circuit for lamp 1BK includes front contact *a* of relay 1B and front contact *a* of relay 1-2RWP. The first of these contacts is closed, of course, to repeat the insertion of the plug in blocking jack 1BJ, while the second front contact closes when switch 1-2W has been positioned in its reverse position which is necessary to prevent cars from entering track T1. A similar circuit for lamp 2BK includes front contact *a* of relay 2B and front contact *a* of relay 1-2NWP. An alternate circuit path for each of these lamps will be discussed later.

A circuit for energizing normal switch indication lamp 1-2NWK may be traced from the positive terminal of the source over back contact *a* of relay 1-2CNZ, front contact *c* of relay 1-2TR, front contact *a* of relay 1-2CP, front contact *a* of relay 1-2NW, front contact *b* of relay 1-2WP, and front contact *b* of relay 1-2NWP through the filament of the lamp to the negative terminal of the source. It will be seen that this circuit not only checks the switch in its normal position, by including front contact *b* of relay 1-2NWP, but also checks that the switch is in correspondence with the requested position since front contact *a* of relay 1-2NW will be closed only when the data processor has entered a normal switch control request. The circuit also is active only when no car is detected as crossing the switch through the use of back contact *a* of relay 1-2CNZ and front contact *c* of relay 1-2TR. The circuit for lamp 1-2RWK has the same common portion, branching over front contact *a* of relay 1-2RW, front contact *c* of relay 1-2WP, and front contact *b* of relay 1-2RWP. If relay 1-2WP releases, the opening of its front contacts *b* and *c* interrupts these circuits for lamps 1-2NWK and 1-2RWK. However, the lamp indicating the final position to which the switch is returned will be illuminated by energy over back contacts *b* and *c* of relay 1-2WP and front contact *b* of relay 1-2NWP or 1-2RWP, respectively, depending upon which is energized. This energy may be coded in order to provide a distinctive indication of the blocked switch condition. Other circuits for these lamps will be described later.

We shall now describe the circuits controlling switch movement 1-2WM and then complete the description of the system operation. Considering first normal valve magnet N, the principal circuit for energizing this magnet winding is traced from the positive source terminal over back contact *c* of relay 1B, back contact *d* of relay 2B, front contact *b* of relay 1-2CP, front contact *b* of relay 1-2NW, front contact *e* of relay 1-2WP, back contact *b* of relay 1-2CNZ, and front contact *d* of relay 1-2TR through the winding of valve magnet N to the negative terminal of the source. A similar circuit for valve magnet R includes the common portion through back contacts *c* and *d* of relays 1B and 2B, respectively, and front contact *b* of relay 1-2CP, thence over back contact *b* of relay 1-2NW, front contact *b* of relay 1-2RW, front contact *d* of relay 1-2WP, back contact *c* of relay 1-2CNZ, and front contact *e* of relay 1-2TR. The completion of either circuit, when a switch command is received from unit CDPU to energize either relay 1-2NW or relay 1-2RW, actuates switch movement 1-2WM to move the switch points to the corresponding position if they are not already in that position. It is to be noted that these principal circuits and others which will be traced are interrupted if section 1-2T is occupied so that relay 1-2TR releases to open its front contacts or relay 1-2CNZ is energized and picks up to open its back contacts.

An alternate path is provided to hold the switch in position during detector track circuit occupancy, or to return the switch points or drive them to full movement if the principal circuit is interrupted prior to the completion of a requested move. If the switch is in its normal position, the release of relay 1-2TR to close its back contact *f* completes a circuit including circuit contactor *b* in its N position to energize the winding of valve magnet N. If circuit controller *b* is in its reverse position, that is, the switch is correspondingly positioned, a circuit is completed for maintaining the energization of valve magnet R. The closing of front contact *d* of relay 1-2CNZ serves a similar purpose if a long car spans the detector track circuit and the occupancy indication is maintained by the energization of this count-not-zero relay. If the track circuit is occupied prior to the completion of a switch movement, the closing of back contact *f* of relay 1-2TR, or front contact *d* of relay 1-2CNZ, will provide energy to valve magnet N or R, depending upon the position of circuit contactor *b*, to complete the operation of the switch to its desired position or to return the switch to its initial position if the half-way point has not been reached. This operation is provided due to the maintaining of the circuit closure by contactor *b* during its movement as indicated by the extension arcs from terminal points N and R, the only open position being a short movement space at the center position of the switch points, which the momentum of the switch points will bridge.

If the switch points are blocked from full movement during operation, for example, by ice or snow between the stock rail and the point, relay 1-2WP will eventually release when its slow release period is exceeded prior to the reclosing of the stick circuit by contactor *a* moving to its full N or R position. The release of relay 1-2WP will energize the opposite position valve magnet due to the reversal of the circuit connections at contacts *d* and *e* of the relay. For example, if the switch is being operated to its reverse position with front contact *b* of relay 1-2RW closed to request the desired position, the release of relay 1-2WP to close its back contact *d* shifts the energy to the previously traced circuit over back contact *b* of relay 1-2CNZ and front contact *d* of relay 1-2TR to valve magnet N, rather than the original circuit connected to valve magnet R. This causes switch movement 1-2WM to return the switch points to their previous normal position, thus protecting against an open-switch condition upon the arrival of the approaching car. As previously described, when the car occupies the track circuit, relay 1-2WP is reenergized by the closing of back contact *b* of relay 1-2TR, the circuit under the assumed condition at this time further including diode D1 and contactor *a* of the switch movement in its N position. It is to be noted that when the car enters the track section, the closing of back contact *f* of relay 1-2TR, under the assumed blocked switch condition, will not restore the switch to provide a safe condition since circuit contactor *b* would be completing the circuit to valve magnet R since it would at least be in contact with the extension portion of its R terminal. Thus the operation of relay 1-2WP is necessary when a switch point is blocked in order to assure at least a closed switch even though a misroute may occur.

An alternate method of control of the switch may be exercised from switch lever 1-2WL. Such control is instituted, upon the selection of the manual mode of operation, by placing lever 1-2WL in a position corresponding to the existing position of the track switch as indicated by the switch position indication light. Energy for operating the proper indication light is provided upon the selection of the manual mode of operation by the temporary closing of the mid position contact b and c of relay MM. For example, if the switch is in its normal position, energy is supplied from the positive terminal of the source over center position contact b of relay MM, front contact b of relay 1-2WP, and front contact b of relay 1-2NWP to the filament of indication lamp 1-2NWK. Under this situation, lever 1-2WL will initially be placed in its N position upon the changeover to the manual mode of operation. The opening of contact C of the lever deenergizes relay 1-2CP which releases, closing its back contact b. This transfers the control circuit network for the valve magnets of the switch movement to bypass front contacts b of relays 1-2NW and 1-2RW, the circuit now including back contact b of relay 1-2CP and contact N or R of lever 1-2WL, as the case may be, thence extending over back contact b or c, respectively, of relay 1-2CNZ as in the originally traced circuits. Since the contacts of the switch control relay which are controlled from the data processor and contacts d and e of relay 1-2WP are now bypassed, switch control is entirely with the manually operable switch lever. Under these conditions, front contact a of relay 1-2CP also opens to interrupt the usual circuits over front contacts a of relays 1-2NW and 1-2RW controlling the switch indication lamps. When relay MM completes its timing period and operates to the full up position, interrupting the circuits through its center position contacts b and c, the indication lamp circuits are then controlled by the upper N and R position contacts of switch lever 1-2WL, positive energy still being supplied over back contact a of relay 1-2CNZ and front contact c of relay 1-2TR.

A final set of circuit paths for switch movement 1-2WM is added by out invention and includes contacts of the blocking relays B in various combinations. If a plug is inserted in blocking jack 1BJ so that relay 1B picks up, a control circuit is completed for energizing valve magnet R of the switch movement. This circuit includes, under the existing conditions, front contact c of relay 1B, back contact c of relay 2B, front contact d of relay 1-2WP, back contact c of relay 1-2CNZ, and front contact e of relay 1-2TR. The energizing of valve magnet R causes the switch movement to operate the switch points to their reverse position for establishing a route to track T2. Since relay 1B is held energized as long as the plug remains in the blocking jack, this inhibits the routing of any cars into track T1 since no circuit can be established for valve magnet N. It will be noted, of course, that during the initial movement of the switch under these conditions, relay 1-2WP still controls if the switch points are blocked from their full reverse position by any foreign matter between the switch points and the stock rail and will return the switch to its normal position at the expiration of its slow release period. Conversely, if the plug is inserted in blocking jack 2BJ in order to inhibit the movement of any cars to track T2, the pickup of relay 2B completes a circuit over back contact c of relay 1B and front contact d of relay 2B to provide energy over front contact e of relay 1-2WP and eventually to valve magnet N of the switch movement, holding or driving the switch points thus to their normal position. All cars then would be routed to track T1 and the route to tracks T2 cannot be established. Said in another way, if either relay 1B or relay 2B is picked up, all other control circuits for the switch movement are interrupted since the supply of energy from the positive terminal of the source to the heel of contact b of relay 1-2CP is interrupted. This latter point is the critical common point in the other control circuits for the switch movement. The control exercised by the contacts of relays 1B and 2B thus bypasses the control by relays NW and RW and by switch lever WL, and switch 1-2W is held in its normal or reverse position without regard to whether automatic or manual operation mode is in effect.

If plugs are inserted in both blocking jacks 1BJ and 2BJ so that both tracks T1 and T2 are blocked or closed off, both relay 1B and relay 2B are picked up to complete a series circuit over their front contacts e through the winding of a common blocking relay 1-2B, shown in the lower left of FIG. 3. At the same time, the closing of front contacts c of relays 1B and 2B completes an alternate circuit from the positive terminal of the source to the heel of contact b of relay 1-2CP, thus restoring control of switch movement 1-2WM to the automatic mode or to switch lever 1-2WL. However, the pickup of relay 1-2B to close its front contact a completes a circuit, through an intervening network similar to that for switch movement 1-2WM and shown by a conventional dotted line, for energizing valve magnet R in switch movement 1-4WM. Switch 1-4W is then positioned by its switch movement to the reverse position in which it is held, thus routing all cuts of cars away from the lead between that switch and switch 1-2W. Thus any car approaching and traversing switch 1-4W will be routed over this switch in its reverse position and thence to track 3 or track 4 as further selected. In other words, the establishing of a route for a car to either track 1 or track 2 under this condition is inhibited and no further cars can be routed into these two tracks which are blocked at this time. When switch 1-4W operates to its reverse position, a relay 1-4RWP, not shown but similar in operation to relay 1-2RWP previously described, picks up. The closing of front contact a of relay 1-4RWP (lower left) completes an indication circuit, further including front contact b of relay 1-2B, and, in parallel, diodes D3 and D4, to supply energy to blocking indication lamps 1BK and 2BK so that both of the track lamps are illuminated to indicate that both of these tracks are in their blocked or closed off condition. Diodes D3 and D4 are necessary to prevent sneak circuits in the regular indication circuits controlling these blocking lamps.

It will be evident, from a review of the preceding circuit description, that similar control circuits may be developed for other yard switches to provide for blocking of selected tracks. Particularly, the movements for switches 1-24W and 9-24W (see FIG. 1) will be provided with special control circuits to position these switches independent of automatic and manual control means if group lead blocking jacks such as 1-8BJ, 9-16BJ, and 17-24BJ are activated by the insertion of a plug to inhibit the further entry of cuts into the corresponding track groups.

Summarizing briefly, we will consider the operation as a cut of cars moves through the track layout illustrated in FIG. 3 and will assume that the cut is designated or destined for track T2. Prior to the arrival of this cut in track section 1-2T, the data processor CDPU outputs a reverse switch command to energize relay 1-2RW. When relay 1-2RW picks up, the closing of its front contact b completes a previously traced circuit for energizing valve magnet R in switch movement 1-2WM. The points of switch 1-2W are thus moved to their reverse position and establish the route into track T2.

As the cut of cars enters section 1-2T, shunting of the track circuit releases relay 1-2TR. The opening of front contacts d and e of this relay interrupts the circuits to valve magnets N and R of the switch movement. However, if the movement of the points to the desired position is not quite complete at this instant, the closing of back contact f of relay 1-2TR completes a circuit including circuit contactor b which will drive the switch to its desired R position, or if necessary return it to the initial N position. As the car wheels in this cut move past detector 1-2WD, the count of the axles is transmitted to unit CDPU. This unit compares the running count with the total axle count previously recorded from the initial car detection apparatus for this particular cut of cars. An indication of the release of relay 1-2TR and thus the occupancy of the track section is also transmitted at the proper time to unit CDPU. As this latter unit compares the axle count previously recorded and the running count at this time, relay 1-2CNZ is energized and picks up as long as the two counts are not equal. The opening of back contacts b and c of relay 1-2CNZ also interrupts the principal energizing circuits for valve magnets N and R within switch movement 1-2WM, and thus interrupts or inhibits any further movement of the switch points as long as this detector relay is energized. If any car in the cut is long enough to span track section 1-2T between its leading and trailing trucks so that relay 1-2TR is reenergized and picks up, the continued energization of relay 1-2CNZ will indicate that the wheel count is not yet comparable and thus maintains a safety condition in which the switch points cannot be moved under the car. The final wheel and axle units of this cut of cars enter section 1-2T after they have been counted by detector 1-2WD but, prior to the release of relay 1-2CNZ, relay 1-2TR is again released and the switch valve magnet circuits remain open to inhibit switch control until the final wheels pass over the switch points and clear the detector track section.

If the yard coordinator had blocked track T2 by inserting a plug in blocking jack 2BJ, relay 2B would have been picked up prior to this cut movement. The opening of back contact d of relay 2B interrupts the normal control circuits for the switch movement valve magnets and the closing of front contact d of relay 2B completes the alternate circuit which energizes valve magnet N so that switch 1-2W would be positioned or held in its normal position routing all cuts of cars to track T1. In other words, the energization of valve magnet R is inhibited when relay 2B picks up and, in addition, valve magnet N is held energized so that the switch movement 1-2WM is prevented from establishing a route to track T2. Thus control by data processor CDPU is bypassed and all cars reaching this point in the yard would be routed into track T1.

The system embodying our invention thus provides a switch control arrangement which will inhibit the operation of the track switch under certain predetermined conditions. The arrangement detects the spanning of the switch detector section by a long car and establishes circuit conditions which inhibit switch movement as a safety factor. Our system also detects the blocking of a track at the selection of the yard coordinator for various reasons and inhibits the subsequent establishing of a route into the track for subsequent cuts of cars. This operation is accomplished in an efficient and economical manner and improves the efficiency and safety of the yard operation.

Although we have herein shown and described but a single control circuit arrangement embodying the switch control features of our invention, it is to be understood that various modifications and changes may be made therein within the scope of the appended claims without departing from the spirit and scope of our invention.

Having thus described our invention, what we claim is:

1. A control arrangement for a track switch in a railroad classification yard, comprising in combination,
   a. a switch movement means operable to move said track switch between two opposite positions to establish a first or a second route for cars traversing said switch,
   b. an automatic control means for said yard for selecting a switch position to establish the desired route for each car scheduled to traverse said switch,
      1. said automatic control means jointly controlled by the entry of a particular car into said yard and the passage of that car at said switch for detecting when that car has completed its passage of a preselected point at said switch.
   c. a position selection means controlled by said automatic control means and connected for controlling said switch movement means to move said track switch to the selected position for an approaching car,
   d. a first inhibit means jointly controlled by said automatic control means and by the movement of a car over said track switch and connected for interrupting the control of said switch movement means by aid position selection means when a car is traversing said switch, and
   e. a second inhibit means operable to block a selected one of the two routes over said switch to car movement and connected when so operated for interrupting the control of said switch movement means by said position selection means to establish said blocked route.

2. A switch control arrangement as defined in claim 1 in which, said second inhibit means further controls said switch movement means for moving and holding said track switch in the position to establish the route other than said selected blocked route.

3. A switch control arrangement as defined in claim 1 in which said first inhibit means comprises,
   a. a first relay means normally occupying a first position and responsive to the presence of a car on said switch to operate to a second position, and
   b. a second relay means also normally occupying a first position and controlled by said automatic control means to a second position for continuously detecting the presence of a car at said switch when said first relay means is rendered ineffective to detect a car by a specific positioning of that car at said switch, c. said first and second relay means jointly controlling said position selection means to interrupt the control of said switch movement means when either relay means occupies its second position.

4. A switch control arrangement as defined in claim 3 which further includes,
   a. a track circuit means at said switch location controlling a track relay for detecting the presence of a car wheel and axle unit within preselected limits including said switch,
      1. said first relay means being the track circuit relay operable to said second position when a wheel and axle unit is detected,
   b. wheel detector means at said switch location operable to detect passage of each axle of a car at a preset point and transmit a corresponding count signal to said automatic control means, and
   c. detection means for registering the axle count of each car entering said yard in said automatic control means,
   d. said automatic control means operable to continuously compare each car axle count successively received from said wheel detector means with the corresponding registered car axle count and further connected for controlling said second relay means to its second position while the compared axle counts are not equal.

5. A switch control arrangement as defined in claim 2 in which said second inhibit means comprises,
   a. selector means for each route diverging from said switch, each normally occupying a first condition and manually operable to a second condition to selectively block entry of cars into the corresponding route,
   b. each selector means connected for interrupting control of said switch movement means by said position selection means and controlling said switch movement means to establish the other route over said switch.

6. A switch control arrangement as defined in claim 3 in which said second inhibit means comprises,
   a. selector means for each route diverging from said switch, each normally occupying a first condition and manually operable to a second condition to selectively block entry of cars into the corresponding route,
   b. each selector means connected for interrupting control of said switch movement means by said position selection means and controlling said switch movement means to establish the other route over said switch.

7. A switch control arrangement as defined in claim 6 in which said position selection means comprises a circuit network including,
   a. two principal circuit paths selectively controlled by said automatic control means for controlling said switch movement means to move said switch to the position corresponding to the desired route for an approaching car,
      1. each principal circuit path including contacts closed by said selector means only in the first condition, and
   b. at least two alternate circuit paths controlled by said selector means for controlling said switch movement means to move said switch to establish the route other than the blocked route,
      1. each alternate circuit path when complete bypassing and inhibiting further control by said automatic control means,
   c. each circuit path including first position contacts of said track circuit relay and first position contacts of said second relay means.

8. In a railroad classification yard control system, including a plurality of track switches to establish routes for cars to selected storage tracks, the combination comprising,
   a. automatic control means operable to receive selected car destinations and control said yard switches to successively establish a route to the selected storage track destination for each car entering said yard,
   b. initial detection means responsive to each car entering said yard and connected for registering in said automatic control means at least the axle count for such cars,
   c. track detection means at each switch for detecting cars occupying predetermined track limits at and including the corresponding switch and operable to a first or a second condition as said track limits are unoccupied or occupied, respectively, by a car,
   d. axle counting means located in the immediate approach to each switch and responsive to the passage of each car axle for registering a count of that axle in said automatic control means,
   e. said automatic control means being responsive to the reception of axle counts from each axle counting means for comparing the new count with the initially registered count for that car to detect when that car completes its passage by the active axle counting means,
   f. count comparison detection means associated with each switch normally occupying a first condition and controlled by said automatic control means to a second condition during the comparison of the registered initial axle count for a car and the new axle count by the corresponding axle counting means when the compared counts are not equal, and
   g. operating means for each switch controlled by said automatic control means for positioning the associated switch to establish the selected route for an approaching car,
   h. said operating means further jointly controlled by both corresponding detection means for inhibiting the positioning of the associated switch to a new position when either of the corresponding detection means in in its second condition.

9. A yard control system as defined in claim 8 in which,
   a. each said track detection means is a track circuit including a track relay normally energized when the track within said limits at said associated switch is unoccupied and becoming deenergized when a car occupies the track within said limits, said track circuit being spannable by certain cars moving in said yard,
   b. each said count comparison detection means is a normally deenergized relay connected to be energized by said automatic control means when compared counts are not equal, and said combination further includes,
   c. a control circuit for each switch operating means including, 1. contacts selectively closed by said automatic control means to actuate said operating means to position the associated switch to establish the selected route for the next approaching car,
2. energized position contacts of the associated track relay, and
3. deenergized position contacts of the associated count comparison relay.

10. In a railroad classification yard control system, including a plurality of track switches to establish routes for cars to selected storage tracks, the combination comprising,
   a. automatic control means connected to receive preselected storage track destinations for cars entering said yard and operable for selecting successive switch positions to establish a route for each car to its preselected destination,
   b. operating means for each switch controlled by aid automatic control means for positioning the associated switch to establish a route for an approaching car in accordance with its preselected destination,
   c. detection means at each switch location responsive to a car traversing the corresponding switch and connected for inhibiting the operation of that switch to establish a different route until the detected car clears the switch location, and
   d. blocking means for each storage track selectively operable to block entry of cars into the corresponding track,
   e. each blocking means connected to the operating means for a final switch to the corresponding storage track for inhibiting all other control of the final switch operating means and for holding said final switch in position to establish only a route leading away from the blocked storage track when that blocking means is in its blocking condition.

11. A yard control system as defined in claim 10 which further includes,
   a. manual control means for each switch operable when selectively actuated for manually selecting switch positions and connected for controlling the associated switch operating means to position that switch to the manually selected position, and in which,
   b. each blocking means includes a relay normally in a first position and selectively operable to a second position to block entry of cars into the corresponding storage track,
   c. each operating means includes a switch movement means for the associated track switch and a control circuit network therefor comprising,
   1. a principal circuit path, including first position contacts of the blocking relay for each route over said associated switch, controlled normally by said automatic control means for selecting a switch position in accordance with the preselected route for the approaching car and at selected times by the associated manual control means when actuated, and connected to the corresponding switch movement means for actuating the positioning of said associated switch to the selected position,
   2. an alternate circuit path controlled by second position contacts of the blocking relays for both routes for bypassing the corresponding principal circuit path and for actuating said corresponding switch movement means to hold said associated switch only in a position to inhibit entry of cars into the selectively blocked track.

12. A track switch control arrangement for a railroad classification yard, in which cuts of cars entering on a single track lead are selectively routed over the switches to a plurality of storage tracks, comprising in combination,
   a. switch movement means for each switch operable for positioning the associated switch to a first or a second position in accordance with the preselected route for each car cut traversing that switch,
   b. automatic control means for registering a preselected destination for each cut entering said yard and connected to select successive switch positions for each cut traversing the yard in accordance with the preselected destinations stored for the car cuts,
   c. initial cut detection means for measuring the parameters of each car cut entering said yard and connected to said automatic control means for storing at least the axle count parameter while the corresponding cut moves to its final destination,
   d. a detector track circuit at each switch for detecting the presence of cuts occupying the switch location within preestablished limits, said track circuits being spannable by certain cars at times included in said cuts,
   e. a wheel detector in approach to each switch responsive to the passage of each wheel and axle unit of cuts traversing the corresponding switch and connected to record that passage as an axle count in said automatic control means,
   1. said automatic control means being responsive to the reception of axle counts from said wheel detectors for comparing the successive count for a cut of cars passing a particular wheel detector with the total axle count for that cut stored by said initial cut detection means,
   f. blocking means associated with each switch operable for at times selectively closing the route over that switch in its first or second position, and
   g. a control circuit network for each switch movement means for actuating its operation to position the corresponding switch in a selected position and controlled by,
   1. said automatic means to select the desired switch position for an approaching cut in accordance with its preselected destination,
   2. the associated track circuit to inhibit switch operation when the track circuit is occupied,
   3. the associated blocking means to inhibit switch operation to establish a closed route, and
   4. said automatic control means to inhibit switch operation when a comparison of the axle counts recorded from the associated wheel detector and stored from said initial cut detection means that a cut is spanning the associated track circuit and switch operation is unsafe.

* * * * *